United States Patent
Chini et al.

(10) Patent No.: US 9,407,736 B1
(45) Date of Patent: Aug. 2, 2016

(54) REMOTE MONITORING AND CONFIGURATION OF PHYSICAL LAYER DEVICES

(71) Applicant: BROADCOM CORPORATION, Irvine, CA (US)

(72) Inventors: Ahmad Chini, Mission Viejo, CA (US); Mehmet Vakif Tazebay, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/624,352

(22) Filed: Feb. 17, 2015

Related U.S. Application Data (60) Provisional application No. 62/103,029, filed on Jan. 13, 2015.

(51) Int. Cl.
*H04W 4/00* (2009.01)
*H04L 29/08* (2006.01)
*H04W 84/04* (2009.01)

(52) U.S. Cl.
CPC .............. *H04L 69/323* (2013.01); *H04W 84/04* (2013.01)

(58) Field of Classification Search
CPC .......................... H04L 69/323; H04W 84/04

USPC ............. 455/422.1, 411, 432.2; 370/328, 338
See application file for complete search history.

(56) References Cited

U.S. PATENT DOCUMENTS

| | | | | |
|---|---|---|---|---|
| 2010/0177783 | A1* | 7/2010 | Kumar | H04L 12/40006 370/438 |
| 2015/0125147 | A1* | 5/2015 | Zhang | H04Q 11/0067 398/58 |

* cited by examiner

*Primary Examiner* — Dhaval Patel
(74) *Attorney, Agent, or Firm* — McDermott Will & Emery LLP (57) ABSTRACT

In the subject system for remote monitoring and configuration, management of a remote physical layer device may be performed by receiving, at a local physical layer device, an incoming message of a first communication format from a controller device. The incoming message may include a request intended for the remote physical layer device that is communicatively coupled to the local physical layer device over a transmission line carrying a data channel and a supplemental channel. The incoming message may be parsed into an outgoing message of a second communication format for sending to the remote physical layer device through the supplemental channel. The local physical layer device may receive a response from the remote physical layer device through the supplemental channel. The local physical layer device may convert the response from the second communication format into the first communication format for sending the converted response back to the controller device.

20 Claims, 7 Drawing Sheets

FIG. 7

REMOTE MONITORING AND CONFIGURATION OF PHYSICAL LAYER DEVICES

CROSS-REFERENCE TO RELATED APPLICATIONS

This application claims the benefit of U.S. Provisional Application No. 62/103,029, filed Jan. 13, 2015, which is incorporated herein by reference in its entirety.

TECHNICAL FIELD

The present description relates generally to an Ethernet communication system, including remote monitoring and configuration of physical layer devices.

BACKGROUND

Management, configuration, diagnostics and health monitoring are essential parts of automotive and industrial networks. The IEEE 802.3 standard defines a set of control and status registers for Ethernet PHY (Physical Layer) operation. Individual products may have additional registers to show status, or for device operation control. These registers are accessible through MDIO (Management Data Input/Output), which is a serial data interface defined by the standard. However, boards or devices designed by various producers may not provide access to MDIO. In addition, PHY vendors may often test and/or debug such boards or devices, which may necessitate access to the PHY registers. In this respect, the IEEE 802.3 bp standard defines a 1000BASE-T1 communication protocol for automotive and industrial Ethernet networking applications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

In the subject system for remote monitoring and configuration of physical layer devices, remote register access (e.g., read and write) through an OAM (Operation, Administration and Maintenance) channel using an Ethernet communication protocol (e.g., 1000BASE-T1) is provided. The IEEE 802.3 bp standard defines an OAM channel for the 1000BASE-T1 to allow exchange of management information over a network link without data interruption. A central management entity (e.g., a master controller) may be configured to program and monitor status registers of one or more network nodes (e.g., secondary remote devices). For example, the subject system relates to a communication mechanism that enables reading and writing into remote PHY registers (i.e., registers located at the secondary remote devices) through an MDI (Medium Dependent Interface) using the OAM channel.

The capability to monitor and manage remote nodes from the central node with more processing capabilities is therefore seen advantageous in many automotive and industrial applications. For example, there are a number of advantages, including but not limited to: (1) central monitoring and configuration in star topology networks, (2) cost reduction by sharing the central management entity among a number of Ethernet nodes, (3) a single diagnostic point for multi-node networks, (4) debugging capability through a network link for devices with no direct management capability, and (5) enhanced cable diagnostic capabilities. For cable diagnostic applications, the subject system can allow for detune of PHY impedance from a remote link to facilitate with more accurate cable measurement. In addition, remote PHY registers providing signal quality data (e.g. MSE (Mean Square Error) or receiver gain) to the central node may be read from the central node for continuous link quality monitoring. Similarly, register access through a remote link partner using the OAM channel for both monitoring and debugging can be provided when an Ethernet PHY is being tested in an EMC (Electromagnetic Compatibility) test chamber or an oven. In automotive applications, the single diagnostic point provides ease of maintenance without adding substantial cost to the overall network. In this respect, remote register access using the OAM channel and through the MDI provides for an enhanced debugging experience.

Figure 1:
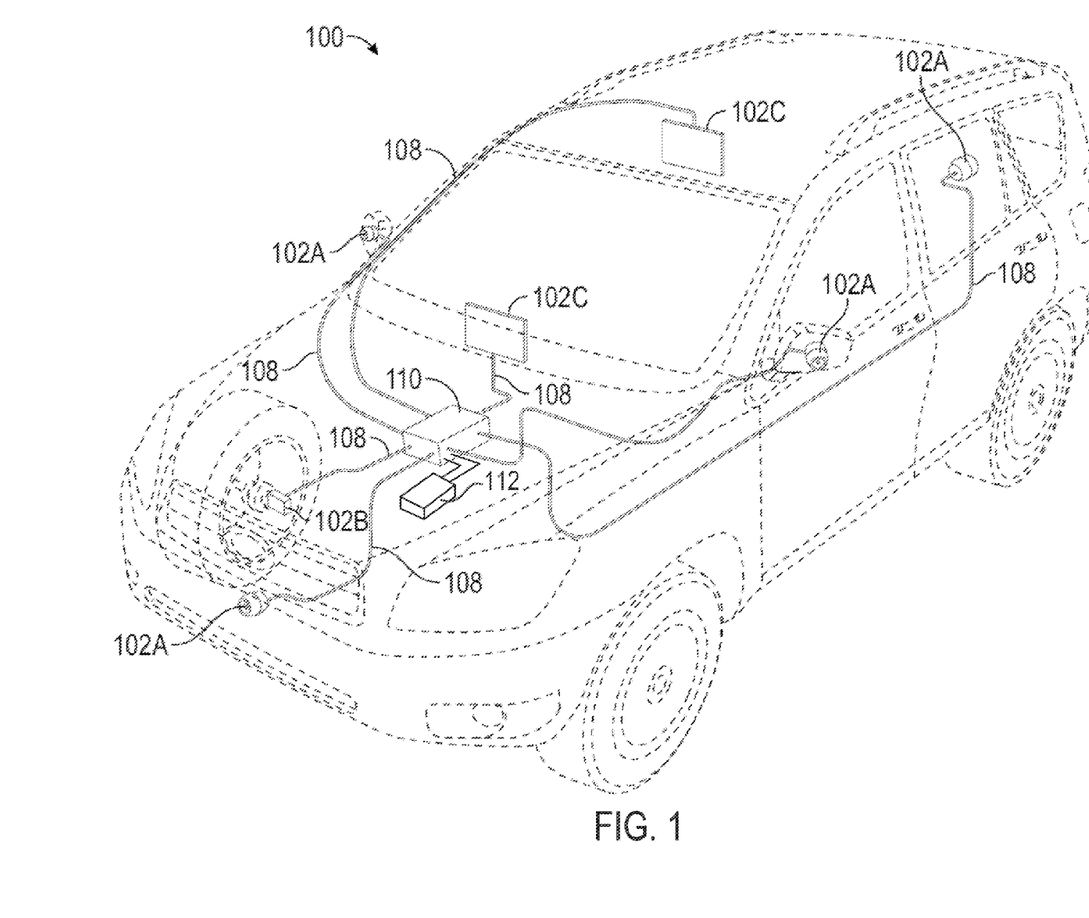
FIG. 1 illustrates an example network environment in which a physical layer remote monitoring and configuration system may be implemented in accordance with one or more implementations.

FIG. 1 illustrates an example network environment 100 in which a physical layer remote monitoring and configuration system may be implemented in accordance with one or more implementations. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The example network environment 100 includes a number of electronic devices 102A-C that are coupled to an electronic device 110 via the transmission lines 108. The electronic device 110 may communicably couple the electronic devices 102A-C to one another. In one or more implementations, one or more of the electronic devices 102A-C are communicatively coupled directly to one another, such as without the support of the electronic device 110. The example network environment 100 also includes an electronic device 112 coupled to the electronic device 110. In this example, the electronic device 110 can communicably couple the electronic device 112 to the electronic devices 102A-C. In one or more implementations, the electronic device 112 is part of the electronic device 110.

In one or more implementations, one or more of the transmission lines 108 are Ethernet transmission lines, such as one or more twisted pair of wires. The electronic device 110 may be, or may include, a switch device, a routing device, a hub device, or generally any device that may communicably couple the electronic devices 102A-C. Any of the electronic devices 102A-C may include, or may be, the electronic system 700 of FIG. 7.

In one or more implementations, at least a portion of the example network environment 100 is implemented within a vehicle, such as a passenger car. For example, the electronic devices 102A-C may include, or may be coupled to, various systems within a vehicle, such as a powertrain system, a chassis system, a telematics system, an entertainment system, a camera system, a sensor system, such as a lane departure system, a diagnostics system, or generally any system that may be used in a vehicle. In FIG. 1, the electronic devices 102A are depicted as camera devices, such as forward-view, rear-view and side-view cameras, the electronic device 102B is depicted as a sensor, such as a local diagnostics system, the electronic devices 102C are depicted as entertainment systems, and the electronic device 112 is depicted as a central on-board diagnostics system. In one or more implementations, the electronic device 110 and/or one or more of the electronic devices 102A-C may be communicatively coupled to a public communication network, such as the Internet.

In one or more implementations, the electronic devices 102A-C and 110 implement a physical layer (PHY) that is interoperable with one or more aspects of one or more physical layer specifications, such as those described in the Institute of Electrical and Electronics Engineers (IEEE) 802.3 Standards (e.g., 802.3 bp). In one or more implementations, the electronic device 110 is configured as a primary node, and the electronic device 102A is configured as a secondary node. For example, the electronic device 110 may provide a clock source for configuring and monitoring the electronic device 102A. In operation, the electronic device 112 may program and monitor the electronic device 102A through the electronic device 110, such as across a twisted pair of wires.

In one or more implementations, the remote configuration and monitoring between the electronic device 110 and the electronic device 102A is performed if remote register access at the electronic device 102A is provided. Registers at the PHY may be accessed remotely through the MDI using the OAM channel. In this regard, the transmission line between the electronic device 110 and the electronic device 102A may be depicted as the MDI having a data channel and a supplemental channel (e.g., the OAM channel). In some aspects, the data channel has a data rate up to 1.0 Gigabits-per-second and the OAM channel has a data rate up to 2.5 Megabits-per-second. However, the data rates for the MDI may vary depending on implementation. OAM packets can be sent from the electronic device 110 and are converted by a local PHY device at the electronic device 102A to MDIO packets for local processing. The electronic device 112 can be depicted as a local management entity for the electronic device 110. In this respect, the electronic device 112 can generate and send a request to the electronic device 110 including an address identifying the electronic device 102A. The request may relate to a read operation to obtain status and control information of the electronic device 102A or a write operation to program the electronic device 102A for a certain configuration.

In one or more implementations, the electronic device 110 determines whether the request from the local management entity (e.g., the electronic device 112) identifies a MDIO communication with a remote physical layer device address. In this respect, any MDIO communication with a remote physical layer device address received by a local physical layer device (e.g., the electronic device 110) is pushed through the OAM channel. At the receiving node (e.g., the electronic device 102A), the OAM packets are converted to MDIO packets for a local PHY device of the electronic device 102A. A response is then sent back from the electronic device 102A over the OAM channel of a reverse link in the transmission line 108. The OAM packets are then converted to MDIO packets at the local PHY device of the electronic device 110 and sent back to the local management entity.

Figure 2:
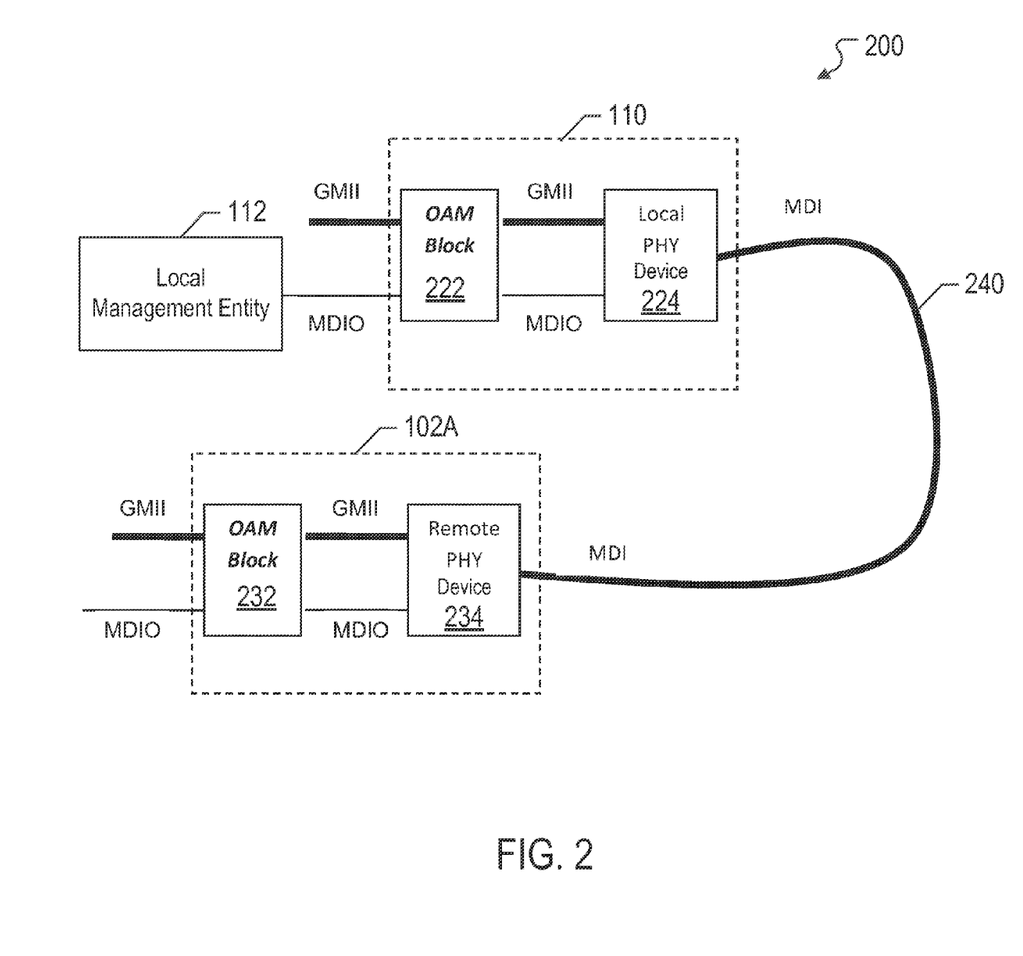
FIG. 2 illustrates an example of a physical layer remote monitoring and configuration system in accordance with one or more implementations.

FIG. 2 illustrates an example of a physical layer remote monitoring and configuration system 200 in accordance with one or more implementations. Not all of the depicted components may be required, however, and one or more implementations may include additional components not shown in the figure. Variations in the arrangement and type of the components may be made without departing from the scope of the claims as set forth herein. Additional components, different components, or fewer components may be provided.

The physical layer remote monitoring and configuration system 200 includes the electronic device 112 of FIG. 1 depicted as a local management entity, the electronic device 110 depicted as a primary node, and the electronic device 102A depicted as a secondary node. The electronic device 110 includes an OAM block 222 and a local PHY device 224. Similarly, the electronic device 102A includes an OAM block 232 and a remote PHY device 234. The OAM block 222 is communicatively coupled to the local PHY device 224 through a GMII (Gigabit Media Independent Interface) and MDIO interface. Similarly, the OAM block 232 is communicatively coupled to the remote PHY device 234 through the GMII and the MDIO interface. The electronic device 110 is communicatively coupled to the electronic device 102A over the network link 240 through the MDI.

In this example, the network link 240 depicts the transmission line 108 of FIG. 1 and can facilitate bidirectional communication. The network link 240 includes the OAM channel, and may include a data channel. The data channel may have a throughput data rate up to 1.0 Gigabit-per-second, and the OAM channel may have a throughput data rate up to 2.5 Megabits-per-second. In various aspects, the MDIO interface relates to a PHY management interface used to read and write control and status registers of a PHY component that are used to configure the PHY before operation, and to monitor link status during operation. In some aspects, the GMII relates to an interface between a PHY component and a media access control (MAC) device for transferring data up to 1.0 Gigabits-per-second.

In one or more implementations, the system 200 represents a network with a star topology and central programming capability through the electronic device 112. In this regard, a primary node (e.g., the electronic device 110) may program and monitor all nodes of the star topology, including the electronic device 102A (e.g., a secondary node), through the MDI using the OAM channel.

Figure 4A:
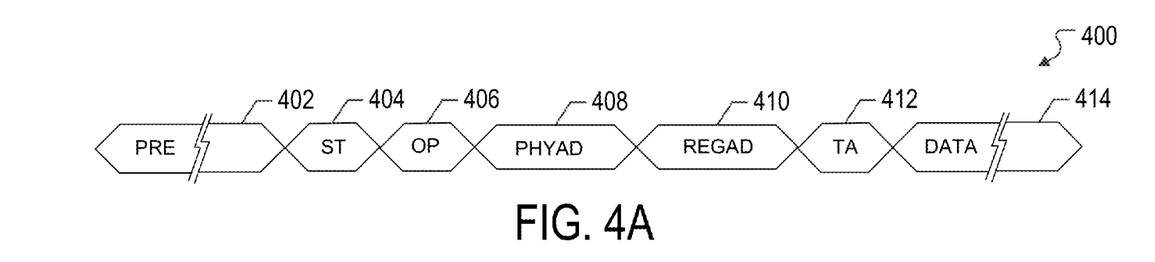
FIGS. 4A-4B illustrate example management frame formats of the physical layer remote monitoring and configuration system in accordance with one or more implementations.

In one or more implementations, the electronic device 110 includes an array of local PHY devices such that the electronic device 112 may need to identify at least one of the local PHY devices for monitoring and configuring a corresponding remote PHY device. In this respect, the electronic device 112 may use a management frame format as depicted in FIG. 4A to identify the local PHY device with a point-to-point connection to the corresponding remote PHY device. For example, the electronic device 112 may broadcast a physical layer device address included in the management frame format such that the identified remote PHY device with a matching address may receive and process a request from the electronic device 110. In this regard, any MDIO communication identifying a remote physical layer device address received by a local PHY device (e.g., the local PHY device 224) is pushed through the OAM channel. In some aspects, the electronic device 112 broadcasts the PHY address of a local PHY device such that the identified local PHY device can process the request locally. Because the electronic device 112 can broadcast a PHY address to each local PHY device of the array of local PHY devices, a subset of the local PHY devices can ignore the request and drop the incoming message containing the request if each of the subset PHY devices and corresponding remote PHY devices are not identified.

During operation, OAM packets may be sent through the OAM channel of the network link 240 from the electronic device 112. In this example, the OAM packets are sent at a throughput data rate of the OAM channel (e.g., 2.5 Mbps). At the receiving node (e.g., the electronic device 102A), the OAM packets are converted to MDIO packets for a local PHY device (e.g., the remote PHY device 234) to process. In this example, the OAM packets are pushed through and converted to MDIO packets by the OAM block 232, and sent back to the remote PHY device 234 for processing. For example, the remote PHY device 234 may perform a physical layer operation, such as a read or write, to a register in the remote PHY device 234. In one or more implementations, the OAM packets are converted to MDIO packets by the remote PHY device 234. In this example, the OAM block 232 may be a part of the remote PHY device 234. The response from the electronic device 102A is then sent back over the OAM channel of a reverse link in the network link 240. The OAM packets are then converted to MDIO packets at the local PHY device 224 and sent back to the electronic device 112.

In one or more implementations, the subject system applies to dynamic memory allocation. In this embodiment, the electronic device 112 may access the local PHY device 224 to communicate a query to the remote PHY device 234 to perform a memory allocation of a defined amount for a particular automotive application. In turn, the remote PHY device 234 may send an answer back to the electronic device 112 confirming the requested memory allocation. The electronic device 112 may subsequently read from and/or write to the allocated memory.

In one or more implementations, the subject system applies to partial networking applications. In this embodiment, the electronic device 112 may communicate a query through the local PHY device 224 to the remote PHY device 234 that instructs the remote PHY device 234 to power down or enter a low-power mode without impacting the power status of associated (or neighboring) remote nodes for power conservation.

Figure 3:
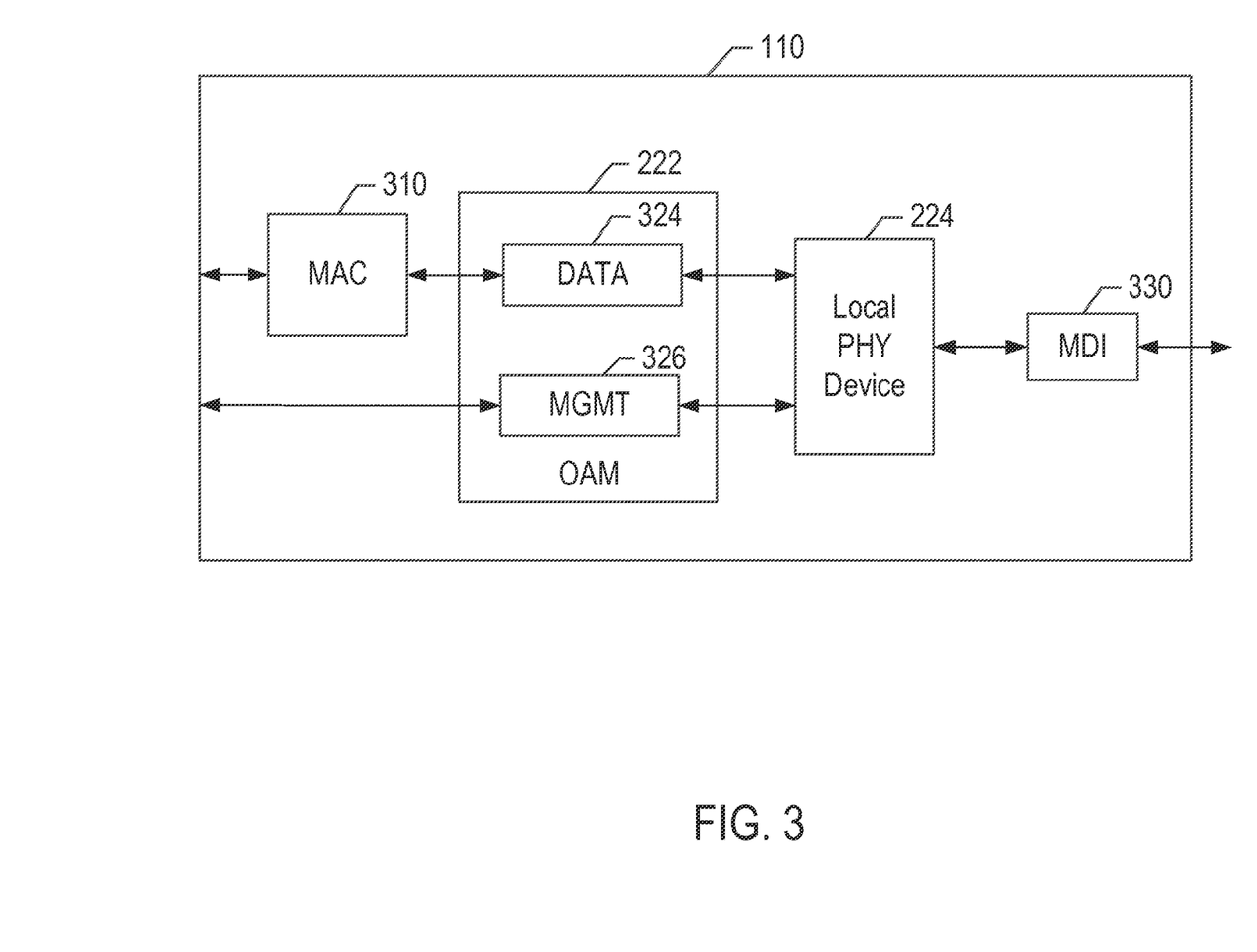
FIG. 3 illustrates an example electronic device that may implement a physical layer remote monitoring and configuration system in accordance with one or more implementations.

FIG. 3 illustrates an example electronic device 110 that may implement a physical layer remote monitoring and configuration system in accordance with one or more implementations. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The example electronic device 110 includes the OAM block 222, the local PHY device 224, a media access control (MAC) component 310 and a MDI component 330. The OAM block 222 includes a data component 324 and a management component 326.

In one or more implementations, the MAC component 310 is communicatively coupled to the local PHY device 224 via a medium independent interface (MII), a gigabit medium independent interface (GMII), a reduced GMII or any other interface. The interface may include transmit, receive, and clock signal lines.

In one or more implementations, the local PHY device 224 is configured to communicatively couple to a remote physical layer device over a transmission line comprising a data channel and a supplemental channel. The transmission line may include one or more twisted pair of wires, such as a single twisted pair of wires, to communicate using a specified Ethernet communication protocol (e.g., 1000BASE-T1).

In one or more implementations, a management component (e.g., the OAM block 222) includes a first interface and a second interface. The first interface and the second interface may each include a first path for data signals and a second path for management signals. In one or more aspects, the first path relates to a gigabit media independent interface (GMII), and the second path relates to a management data input/output (MDIO) interface. The OAM block 222 may communicably couple to a controller device (e.g., the electronic device 112 of FIG. 2) via the second path through the first interface. In addition, the OAM block 222 may communicably couple to the MAC component 310 via the first path through the first interface. The OAM block 222 may communicably couple to the local PHY device 224 through the second interface.

The OAM block 222 may receive an incoming message of a first communication format from the MAC component 310. In one or more implementations, the OAM block 222 receives the incoming message from a controller device (e.g., the electronic device 112 of FIG. 2) through the second path (e.g., MDIO). The controller device may be a part of the example electronic device 110 or communicatively coupled to the example electronic device 110. The incoming message may include a request intended for a remote physical layer device (e.g., the electronic device 102A). In turn, the OAM block 222 may parse the incoming message into an outgoing message of a second communication format. The second communication format may include one or more information blocks that correspond to at least a portion of information blocks in the first communication format. The request may be inserted into the outgoing message for transmission to the remote physical layer device. The request may relate to a physical layer operation to be performed at the remote physical layer device.

In one or more implementations, the outgoing message includes a first communication segment including an operation block, an address block and an indication block, the operation block including an indication of the physical layer operation, the address block identifying a register address associated with a register of the remote physical layer device, the indication block identifying whether the physical layer operation relates to a query or an answer to the query. The outgoing message also may include a second communication segment including a first data block, the data block including first data for storage in the register at the first address. The outgoing message further may include a third communication segment including a second data block, the second data block including second data for storage in the register at the register address. In this respect, the second communication segment is sent subsequent to the first communication segment and the third communication segment is sent subsequent to the second communication segment.

The local PHY device 224 may be configured to send the outgoing message to the remote physical layer device through the MDI component 330 using a supplemental channel (e.g., the OAM channel). In one or more implementations, local PHY device 224 receives a response from the remote physical layer device through the supplemental channel. The local PHY device 224 may translate the response from the second communication format (e.g., OAM communication) to the first communication format (e.g., MDIO communication). In turn, the local PHY device 224 may send the converted response to the controller device through the management component using the second path.

The remote configuration and monitoring process of the subject system is discussed further below, e.g. with respect to FIGS. 5 and 6.

The MDI 330 may provide an interface from the local PHY device 224 to the physical medium used to carry the transmission, e.g. the transmission lines 108. In one or more implementations, one or more of the MAC component 310, the OAM block 222, the local PHY device 224, and the MDI 330, or one or more portions thereof, may be implemented in software (e.g., subroutines and code). In one or more implementations, one or more of the MAC component 310, the OAM block 222, the local PHY device 224 and the MDI 330, or one or more portions thereof, may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

In one or more implementations, the local PHY device 224 includes a physical coding sublayer (PCS) component (not shown) and a physical medium attachment (PMA) component (not shown). The PCS component may include one or more blocks that convert transmit data received from the MAC component 310 to symbols, such as pulse amplitude component converted symbols, 4-bit to 5-bit (4B/5B) converted symbols, 4-bit to 3-bit (4B/3B) converted symbols, or generally any symbols, to be passed to the PMA module. The PCS component may also scramble the transmit data, e.g. to control the radiated emissions on the twisted pair cable, using a side-stream scrambler function that generates a data scrambling sequence. The PMA component may perform one or more functions to facilitate uncorrupted data transmission, such as adaptive equalization, echo and/or crosstalk cancellation, automatic gain control (AGC), etc.

Figure 4B:
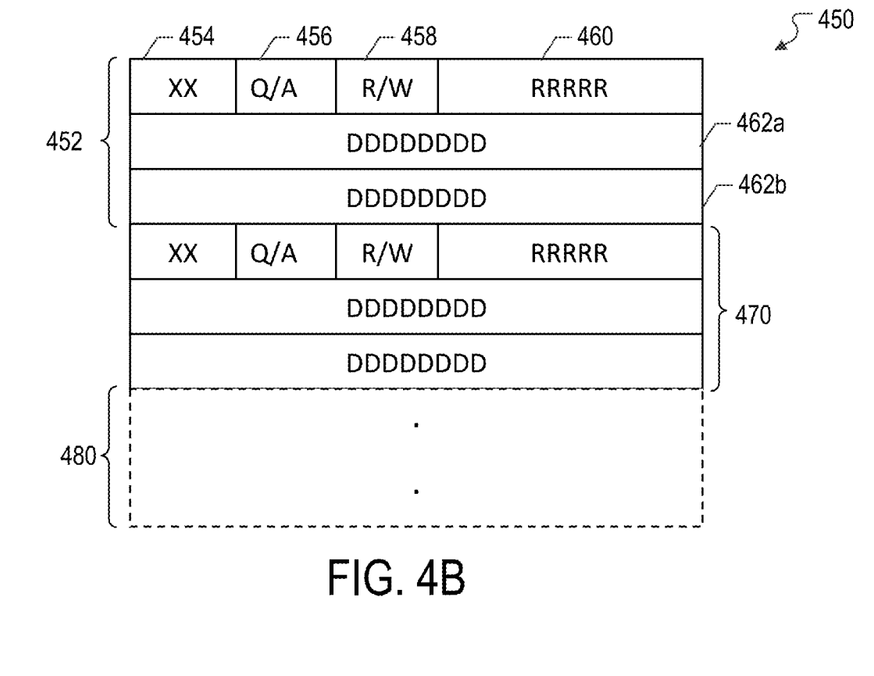

FIGS. 4A-4B illustrate example management frame formats of the physical layer remote monitoring and configuration system in accordance with one or more implementations. Referring to FIG. 4A, an MDIO communication frame format 400 is used by a central management entity (e.g., the electronic device 112 of FIG. 2) to access local PHY registers (e.g., device registers at the local PHY device 224 of FIG. 2) through the MDIO. With reference to Table 1, the MDIO communication frame format 400 includes: a preamble 402, a start-of-frame (ST) portion 404, an operational (OP) code 406, a port address 408, a device address 410, a turnaround time 412, and an address/data block 414.

TABLE 1

Management Frame Format

Management frame fields

| | PRE/<br>32 b | ST | OP | PHYAD | REGAD | TA | DATA/<br>16 b | IDLE |
|---|---|---|---|---|---|---|---|---|
| READ | 1...1 | 01 | 10 | AAAAA | RRRRR | Z0 | D...D | Z |
| WRITE | 1...1 | 01 | 01 | AAAAA | RRRRR | 10 | D...D | Z |

The MDIO communication frame format 400 illustrated in FIG. 4 can be referred to as an extended MDIO frame format. The extended MDIO frame format may allow access up to 65,536 registers, in 32 different physical devices, on 32 different ports.

Using the extended MDIO frame format, the MDIO communication protocol may utilize two transactions to access each register. First, a frame representing an address transaction is sent to specify a MDIO manageable device (e.g., the electronic device 110) and the register within the specified electronic device 110. For example, in an address transaction, the address/data block 414 includes the address of a register within the specified electronic device 110. A second frame is then sent to perform the read or write transaction. During a read or write transaction, the address/data block 414 includes the data that has been read from the register specified by the address transaction, or the data to be written at the destination address, respectively.

The extended MDIO frame format is identified using the start-of-frame (ST) portion 404 of the frame. In particular, the value of the ST portion 404 may be set as "00," which identifies Clause 45 data frames (e.g., IEEE 802.3ae standard), while the original MDIO frame format (Clause 42) is identified with a ST portion 404 having the value of "01."

Similarly, the value of the OP code 406 of the extended MDIO frame format identifies the current transaction to be performed. For example, the various transactions and corresponding OP code values may be as follows: ADDRESS (00), WRITE (01), READ (11), and a READ-AND-INCREMENT-ADDRESS (READ-INCREMENT) (10).

In operation, each MDIO transaction is initiated by the preamble 402 (e.g., a fixed 32-bit pattern), followed by a 4-bit start-of-frame (ST) portion 404. A 4-bit OP code 406 then follows, indicating the current transaction type as discussed above. For example, the ADDRESS transaction is used to latch a register address into the specified electronic device 102A via an OAM packet transmitted through the MDI using the OAM channel. This latched register address identifies the internal control and/or status register that is affected by subsequent WRITE, READ, and READ-INCREMENT transactions targeting the specified electronic device 102A.

The specified electronic device 110 targeted to respond to the current transaction is identified by a 5-bit port address 408 and a 5-bit device address 410 following the OP code 406. Then, 16-bit register address/data block 414 is driven on to a MDIO signal line by a station management entity (e.g., the electronic device 112) in the case of an ADDRESS transaction, or a WRITE transaction, respectively. In the case of a READ or READ-INCREMENT transaction, 16-bits of requested data are driven on to the MDIO signal line by the responding electronic device 110.

The management frame format may include a physical layer address field (PHYAD) to identify a particular local PHY where the electronic device 110 includes, or is coupled to, multiple local PHYs. In order to access a remote PHY device (e.g., the electronic device 102A), the PHYAD for the remote PHY device needs to be defined. In one example, the PHYAD for the remote nodes is to set to use even addresses and the PHYAD for the local nodes is set to use odd addresses (e.g., PHYAD+1). In this respect, an OAM packet carrying an even address received by a local PHY device is pushed through the OAM channel to the intended remote PHY device. In some aspects, the local PHY device identifies the even address as an address to a corresponding remote PHY device since each local PHY device has a point-to-point connection to a remote PHY device. In an aspect, the PHYAD for a particular local PHY device (e.g., the local PHY device 224) is known to the electronic device 112 (or the local management entity). Alternatively, the physical layer device address scheme for remote nodes may be odd addresses, and even addresses for local nodes. In one or more implementations, the PHYAD for the local PHY device having a point-to-point connection to the remote PHY device is defined.

Referring to FIG. 4B, an OAM packet 450 may be configured to carry relevant information to read and write the remote PHY registers. In one or more implementations, the OAM packet 450 includes three consecutive octets of information in a communication frame 452. The OAM packet 450 also includes a second communication 470, and one or more additional communication frames 480. In this regard, multiple register reads and writes may be communicated with one OAM packet.

The OAM packet 450 includes a first binary field 456 to indicate the physical layer operation as a query or a response to the query, a second binary field 458 to indicate the Read/Write (R/W) operation and a 5-bit register address 460 (REGAD) to form a first communication segment. A 16-bit register data block split into two 8-bit register data fields (DATA) make up second and third communication segments 462a and 462b, respectively. In this example, the first, second and third communication segments are part of the communication frame 452. Since register access through the MDI is point to point, the particular PHYAD may not need to be communicated to the electronic device 102A. In some aspects, the first communication segment includes a two-bit unused field 454.

In this example, the electronic device 102A is targeted to respond to the current transaction identified by the 5-bit register address 460 following the first binary field 456 and second binary field 458. Then, the 16-bit register data of communication segments 462a and 462b are driven on to the MDIO signal line by a station management entity associated with the electronic device 110 in the case of an ADDRESS transaction, or a WRITE transaction, respectively. In the case of a READ or READ-INCREMENT transaction, 16-bits of requested data (e.g., segments 462a and 462b) are driven on to the MDIO signal line by the responding electronic device 102A. In this respect, the first binary field 456 may be set to "1" to indicate a response to the query, and the second binary field 458 may be set to "10" to indicate a read-increment transaction.

Figure 5:
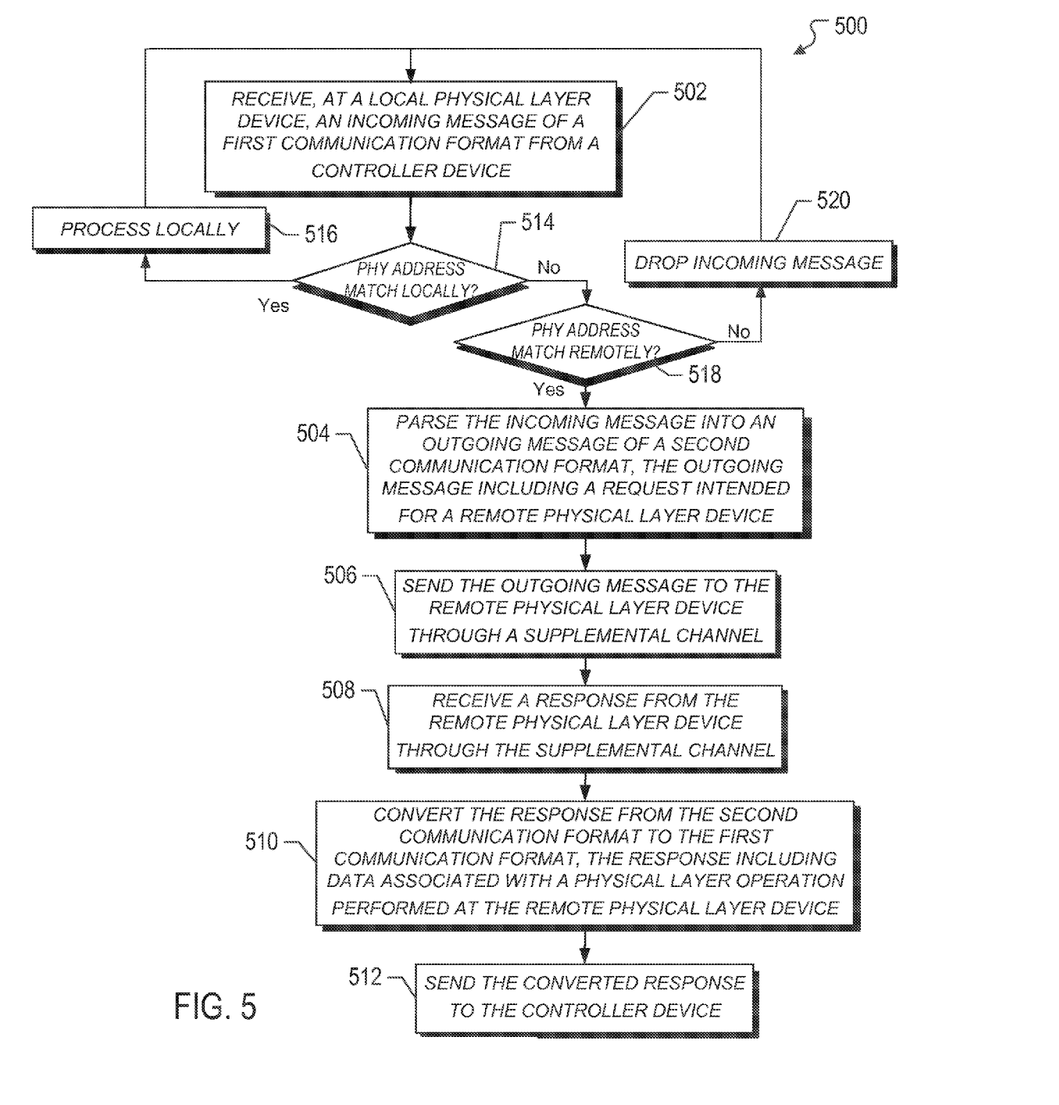
FIG. 5 illustrates a flow diagram of an example process of an example primary electronic device that is in communication with an example secondary electronic device implementing a physical layer remote monitoring and configuration system in accordance with one or more implementations.

FIG. 5 illustrates a flow diagram of an example process 500 of an example electronic device 110 that is in communication with an example electronic device 102A implementing a physical layer remote monitoring and configuration system in accordance with one or more implementations. For explanatory purposes, the example process 500 is described herein with reference to the electronic devices 102A-B of FIG. 1; however, the example process 500 is not limited to the electronic devices 102A-B of FIG. 1, and the example process 500 may be performed by one or more components of one or more of the electronic devices 110 and 102A, such as the OAM block 222 and the local PHY device 224 of the electronic device 110. Further for explanatory purposes, the blocks of the example process 500 are described herein as occurring in serial, or linearly. However, multiple blocks of the example process 500 may occur in parallel. In addition, the blocks of the example process 500 need not be performed in the order shown and/or one or more of the blocks of the example process 500 need not be performed.

A electronic device 110 (e.g., a local physical layer device) receives an incoming message of a first communication format from a controller device (502). In this example, the controller device may be a station management entity configured to communicably couple to the OAM block 222 of the electronic device 110 through a management data input/output interface (or MDIO). The incoming message may include a request intended for a electronic device 102A (e.g., a remote physical layer device) that is communicatively coupled to the electronic device 110 over the transmission lines 108. The transmission lines 108 may include a data channel and a supplemental channel.

The electronic device 110 determines whether the request contains a PHY address that matches a local PHY device (514). If the request does identify a local PHY device as the intended recipient, then the local PHY device can process the request locally (516). Thereafter, the electronic device 110 can return to step 502 to monitor for a next incoming message. If the request does not identify the local PHY device as an intended recipient, then the local PHY device can determine if the PHY address identifies a corresponding remote PHY device (518). If the PHY address corresponds to the remote PHY device, then the electronic device 110 can parse the incoming message containing the request. Otherwise, the electronic device 110 can ignore the request, and drop the incoming message containing the request (520). In turn, the electronic device 110 can return to step 502.

The electronic device 110 parses the incoming message into an outgoing message of a second communication format (e.g., three octets of MDIO information carried in an OAM packet) (504). The request may be included in the outgoing message for transmission to the electronic device 102A. The electronic device 110 sends the outgoing message to the electronic device 102A through the supplemental channel (e.g., OAM channel) (506). The request may relate to a physical layer operation (e.g., read, read-increment, write, address) to be performed at the electronic device 102A. Following the requested physical layer operation, the electronic device 110 receives a response from the electronic device 102A through the supplemental channel (508). In turn, the electronic device 110 converts the response from the second communication format (e.g., OAM-specific communication) to the first communication format (e.g., MDIO-specific communication) (510). The response, after conversion, can be analyzed and identified to include data associated with the physical layer operation performed at the electronic device 102A. Thereafter, the electronic device 110 sends the converted response to the controller device that is requesting the data (512).

In one or more implementations, the incoming message includes an address block such that the electronic device 110 can screen the incoming message by determining that the address block identifies a port address corresponding to the electronic device 102A. In this regard, the electronic device 110 can push the incoming message through the supplemental channel based on the identified port address. As such, the outgoing message can represent the pushed incoming message since the electronic device 110 passes the incoming message through without local physical layer processing.

In one or more implementations, the electronic device 110 extracts an operation block, an address block and a data block from the incoming message as part of parsing the incoming message. The operation block may include an indication of the physical layer operation. For example, the indication may relate to a binary field identifying whether the operation is a read or write transaction. The electronic device 110 may place the operation block and the address block into a first transmission segment of a communication frame in the outgoing message. The address block may identify a register address associated with a register of the electronic device 102A. In addition, the electronic device 110 may place an indication block in the first transmission frame. For example, the indication block may identify whether the physical layer operation relates to a query or an answer to a query. In turn, the electronic device 110 may place a first data segment based on at least a portion of the data block into a second transmission segment of the communication frame. The electronic device 110 further may place a second data segment based on a remainder portion of the data block into a third transmission segment of the communication frame. In this respect, the second transmission segment is sent subsequent to the first transmission segment and the third transmission segment is sent subsequent to the second transmission segment.

In one or more implementations, the electronic device 110 associates the outgoing message with a data stream having multiple data packets and multiple management packets as part of sending the outgoing message. The data packets may be associated with the data channel and the management packets may be associated with the supplemental channel (or OAM channel). In addition, the electronic device 110 can encapsulate the outgoing message into one of the management packets. The electronic device 110 can thereafter send the outgoing message as part of the data stream at a data rate that is smaller than a data rate corresponding to the data packets. In this example, the outgoing message may be sent at a throughput rate of 2.5 Megabits-per-second (e.g., the outgoing message being clocked at 2.5 MHz). In this respect, the electronic device 110 may send a clock signal with the outgoing message to the electronic device 102A.

In one or more implementations, the electronic device 110 sends the outgoing message by sending one or more management packets. At least one of the one or more management packets may contain the outgoing message. In this respect, the outgoing message may include multiple transmission frames corresponding to respective physical layer operations performed over consecutive time durations. In some aspects, each of the transmission frames includes three segments having respective octets of information. In this example, the MDI may be an 8-bit interface but the interface size may vary depending on implementation.

Figure 6:
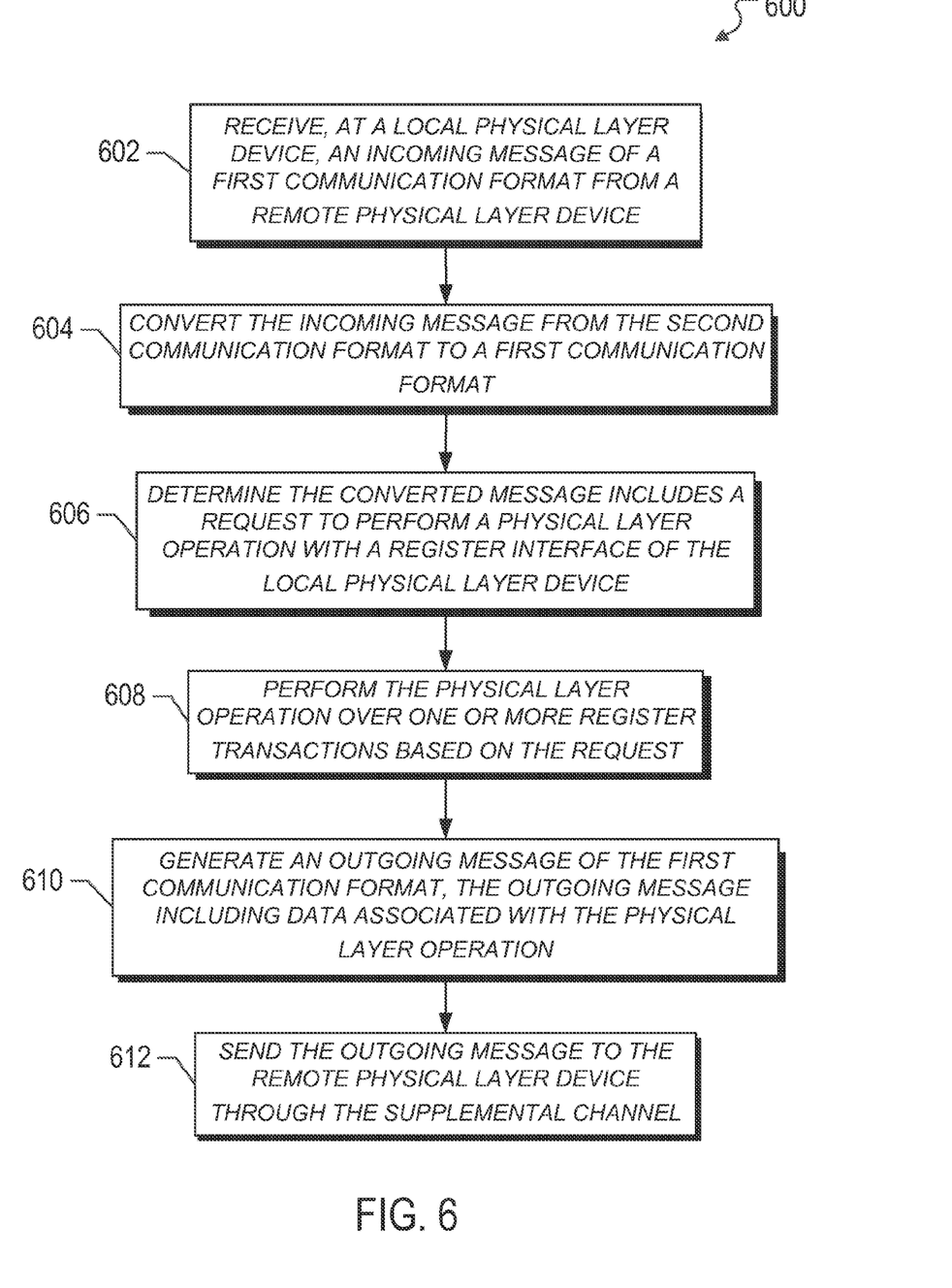
FIG. 6 illustrates a flow diagram of another example process of an example secondary electronic device that is in communication with an example primary electronic device implementing a physical layer remote monitoring and configuration system in accordance with one or more implementations.

FIG. 6 illustrates a flow diagram of an example process 600 of an example electronic device 110 that is in communication with an example electronic device 102A implementing a physical layer remote monitoring and configuration system in accordance with one or more implementations. For explanatory purposes, the example process 600 is described herein with reference to the electronic devices 102A-B of FIG. 1; however, the example process 600 is not limited to the electronic devices 102A-B of FIG. 1, and the example process 600 may be performed by one or more components of one or more of the electronic devices 110 and 102A, such as the OAM block 232 and the remote PHY device 234 of the electronic device 102A. Further for explanatory purposes, the blocks of the example process 600 are described herein as occurring in serial, or linearly. However, multiple blocks of the example process 600 may occur in parallel. In addition, the blocks of the example process 600 need not be performed in the order shown and/or one or more of the blocks of the example process 600 need not be performed.

A electronic device 102A (e.g., a local physical layer device) receives an incoming message of the first communication format from the electronic device 110 (e.g., a remote physical layer device) (602). In this example, the electronic device 110 is communicatively coupled to the electronic device 102A over a transmission line carrying both a data channel and a supplemental channel. The electronic device 102A converts the incoming message from a first communication format (e.g., OAM-specific communication) to a second communication format (e.g., MDIO-specific communication) such that a local PHY can process the MDIO communication (604). The electronic device 102A determines that the converted message includes a request to perform a physical layer operation with a register interface of the electronic device 102A (606). The electronic device 102A responds to the request by performing the physical layer operation, such as a read transaction, over one or more register transactions based on the request (608). In turn, the electronic device 102A generates an outgoing message of the first communication format (610). The outgoing message may include data associated with the physical layer operation so that the requesting entity can obtain status and/or control information of the electronic device 102A. The electronic device 102A sends the outgoing message to the electronic device 110 through the supplemental channel (612). In this example, the sent message is then forwarded to the controller device that is communicably coupled to the primary electronic device 102A through the MDIO.

Figure 7:
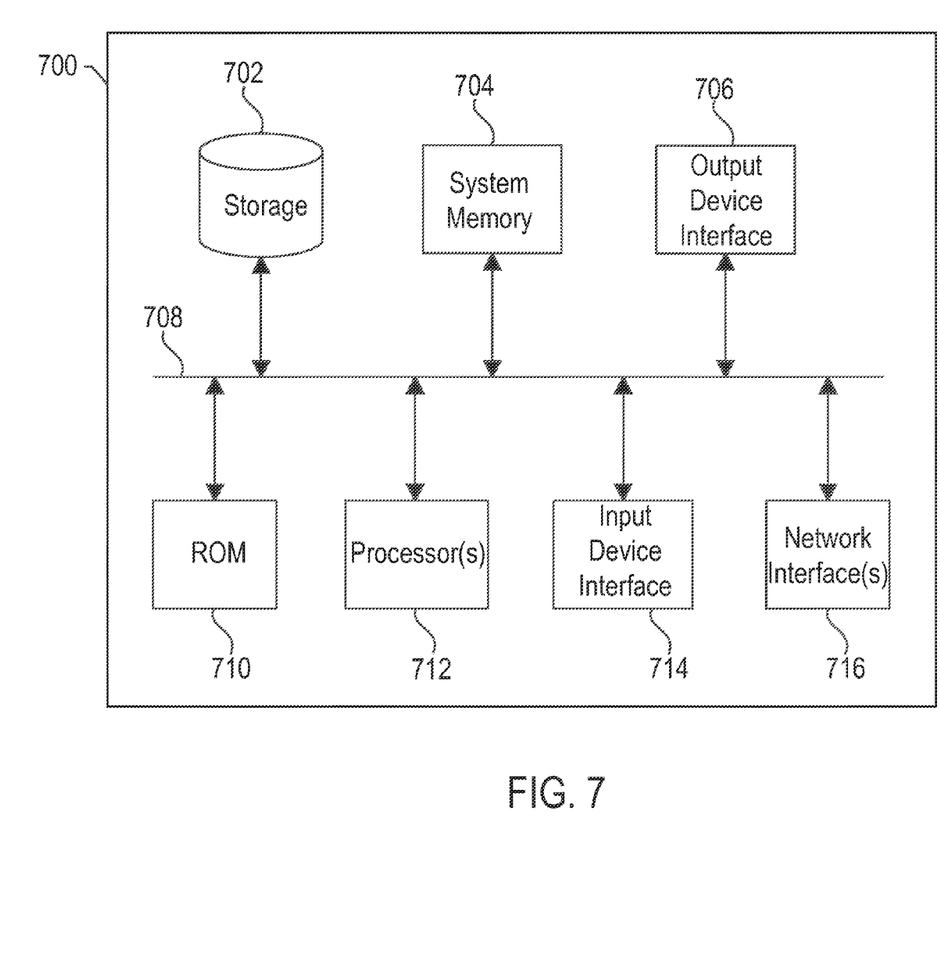
FIG. 7 conceptually illustrates an electronic system with which one or more implementations of the subject technology may be implemented.

FIG. 7 conceptually illustrates an electronic system 700 with which one or more implementations of the subject technology may be implemented. The electronic system 700, for example, may be, or may be coupled to, a powertrain system, a chassis system, a telematics system, an entertainment system, a camera system, a sensor system, such as a lane departure system, a diagnostics system, a gateway device, a set-top box, a desktop computer, a laptop computer, a tablet computer, a server, a switch, a router, a base station, a receiver, a phone, a personal digital assistant (PDA), or generally any electronic device that transmits signals over a network. The electronic system 700 can be, and/or can be a part of, the electronic device 110, and/or one or more of the electronic devices 102A-C. Such an electronic system includes various types of computer readable media and interfaces for various other types of computer readable media. The electronic system 700 includes a bus 708, one or more processor(s) 712, a system memory 704 or buffer, a read-only memory (ROM) 710, a permanent storage device 702, an input device interface 714, an output device interface 706, and one or more network interface(s) 716, or subsets and variations thereof.

The bus 708 collectively represents all system, peripheral, and chipset buses that communicatively connect the numerous internal devices of the electronic system 700. In one or more implementations, the bus 708 communicatively connects the one or more processor(s) 712 with the ROM 710, the system memory 704, and the permanent storage device 702. From these various memory units, the one or more processor(s) 712 retrieve instructions to execute and data to process in order to execute the processes of the subject disclosure. The one or more processor(s) 712 can be a single processor or a multi-core processor in different implementations.

The ROM 710 stores static data and instructions that are needed by the one or more processor(s) 712 and other modules of the electronic system 700. The permanent storage device 702, on the other hand, may be a read-and-write memory device. The permanent storage device 702 may be a non-volatile memory unit that stores instructions and data even when the electronic system 700 is off. In one or more implementations, a mass-storage device (such as a magnetic or optical disk and its corresponding disk drive) may be used as the permanent storage device 702.

In one or more implementations, a removable storage device (such as a floppy disk, flash drive, and its corresponding disk drive) may be used as the permanent storage device 702. Like the permanent storage device 702, the system memory 704 may be a read-and-write memory device. However, unlike the permanent storage device 702, the system memory 704 may be a volatile read-and-write memory, such as random access memory. The system memory 704 may store any of the instructions and data that one or more processor(s) 712 may need at runtime. In one or more implementations, the processes of the subject disclosure are stored in the system memory 704, the permanent storage device 702, and/or the ROM 710. From these various memory units, the one or more processor(s) 712 retrieve instructions to execute and data to process in order to execute the processes of one or more implementations.

The bus 708 also connects to the input device interface 714 and the output device interface 706. The input device interface 714 enables a user to communicate information and select commands to the electronic system 700. Input devices that may be used with the input device interface 714 may include, for example, alphanumeric keyboards and pointing devices (also called "cursor control devices"). The output device interface 706 may enable, for example, the display of images generated by the electronic system 700. Output devices that may be used with the output device interface 706 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

As shown in FIG. 7, the bus 708 also couples the electronic system 700 to one or more networks (not shown), one or more of the electronic devices 102A-C, and/or the electronic device 110, through one or more network interface(s) 716. One or more network interface(s) may include an Ethernet interface, a WiFi interface, a multimedia over coax alliance (MoCA) interface, a medium independent interface (MII), a reduced gigabit media independent interface (RGMII), or generally any interface for connecting to a network. The one or more network interfaces 716 may include, or may be coupled to, a physical layer module, such as the PHY component 320. In this manner, the electronic system 700 can be a part of one or more networks of computers (such as a local area network ("LAN"), a wide area network ("WAN"), or an Intranet, or a network of networks, such as the Internet. Any or all components of the electronic system 700 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as application specific integrated circuits (ASICs) or field programmable gate arrays (FPGAs). In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A computer-implemented method for remote monitoring and configuration, the method comprising:
   receiving, at a local physical layer device, an incoming message of a first communication format from a controller device, the incoming message comprising a request intended for a remote physical layer device that is communicatively coupled to the local physical layer device over a transmission line comprising a data channel and a supplemental channel;
   parsing the incoming message into an outgoing message of a second communication format, the request being included in the outgoing message for transmission to the remote physical layer device;
   sending the outgoing message to the remote physical layer device through the supplemental channel, the request relating to a physical layer operation to be performed at the remote physical layer device;
   receiving a response from the remote physical layer device through the supplemental channel;
   converting the response from the second communication format to the first communication format, the response comprising data associated with the physical layer operation performed at the remote physical layer device; and
   sending the converted response to the controller device.

2. The computer-implemented method of claim 1, wherein the incoming message includes an address block, further comprising:
   determining the address block identifies an address corresponding to the remote physical layer device; and
   pushing the incoming message through the supplemental channel based on the address, the outgoing message representing the incoming message.

3. The computer-implemented method of claim 1, wherein sending the outgoing message comprises:

associating the outgoing message with a data stream comprising a plurality of data packets and a plurality of management packets, the plurality of data packets associated with the data channel and the plurality of management packets associated with the supplemental channel;

encapsulating the outgoing message into one of the plurality of management packets; and sending the outgoing message as part of the data stream at a data rate that is smaller than a data rate corresponding to the plurality of data packets.

4. The computer-implemented method of claim 1, wherein parsing the incoming message into the outgoing message comprises:

extracting an operation block, an address block and a data block from the incoming message, the operation block including an indication of the physical layer operation;

placing the operation block and the address block in a first transmission frame;

placing an indication block in the first transmission frame, the indication block identifying whether the physical layer operation relates to a query or an answer to the query;

placing a first data segment based on at least a portion of the data block in a second transmission frame; and placing a second data segment based on a remainder portion of the data block in a third transmission frame.

5. The computer-implemented method of claim 1, wherein sending the outgoing message comprises:

sending a first communication segment including an address block, the address block identifying a register address associated with a register of the remote physical layer device;

sending a second communication segment including a first data block, the data block including first data for storage in the register at the register address; and sending a third communication segment including a second data block, the second data block including second data for storage in the register at the register address, wherein the second communication segment is sent subsequent to the first communication segment and the third communication segment is sent subsequent to the second communication segment, and wherein the outgoing message includes the first communication segment, the second communication segment and the third communication segment.

6. The computer-implemented method of claim 1, wherein sending the outgoing message comprises sending a plurality of management packets, at least one of the plurality of management packets containing the outgoing message, the outgoing message comprising a plurality of transmission frames corresponding to respective physical layer operations performed over consecutive time durations, each of the plurality of transmission frames comprising three segments having respective octets of information.

7. The computer-implemented method of claim 1, wherein the physical layer operation includes at least one of a read access or a write access with respect to a register interface of the remote physical layer device.

8. The computer-implemented method of claim 1, wherein sending the outgoing message comprises sending the outgoing message at a data rate that is smaller than a data rate corresponding to the data channel.

9. A computer-implemented method for remote monitoring and configuration in a network of physical layer devices, the method comprising:

receiving, at a local physical layer device, an incoming message of a first communication format from a remote physical layer device, the remote physical layer device being communicatively coupled to the local physical layer device over a transmission line comprising a data channel and a supplemental channel;

converting the incoming message from the first communication format to a second communication format;

determining the converted message includes a request to perform a physical layer operation with a register interface of the local physical layer device;

performing the physical layer operation over one or more register transactions based on the request;

generating an outgoing message of the first communication format, the outgoing message including data associated with the physical layer operation; and sending the outgoing message to the remote physical layer device through the supplemental channel, the sent outgoing message forwarded to a controller device associated with the remote physical layer device.

10. The computer-implemented method of claim 9, wherein sending the outgoing message comprises:

sending a first communication segment including an address block, the address block identifying a register address associated with a register of the remote physical layer device;

sending a second communication segment including a first data block, the data block including first data for storage in the register at the register address; and sending a third communication segment including a second data block, the second data block including second data for storage in the register at the register address, wherein the second communication segment is sent subsequent to the first communication segment and the third communication segment is sent subsequent to the second communication segment, and wherein the outgoing message includes the first communication segment, the second communication segment and the third communication segment.

11. The computer-implemented method of claim 9, wherein the physical layer operation includes at least one of a read access or a write access with respect to the register interface.

12. The computer-implemented method of claim 9, wherein sending the outgoing message comprises sending the outgoing message at a data rate that is smaller than a data rate corresponding to the data channel.

13. The computer-implemented method of claim 9, wherein performing the physical layer operation comprises at least one of writing data into the register interface to configure the local physical layer device or reading data from the register interface to obtain status and control information of the local physical layer device.

14. A communication device for remote management and configuration in a network of physical layer devices, the communication device comprising:

a physical layer component configured to communicatively couple to a remote physical layer device over a transmission line comprising a data channel and a supplemental channel; and a management component comprising a first interface and a second interface, the first interface configured to communicatively couple to a controller device, the second interface coupled to the physical layer component, the first interface and the second interface each including a first path for data signals and a second path for management signals, the management component configured to:
  receive an incoming message of a first communication format from a controller device through the second path, the incoming message comprising a request intended for the remote physical layer device, and
  parse the incoming message into an outgoing message of a second communication format, the request being included in the outgoing message for transmission to the remote physical layer device, and
the physical layer component configured to:
  send the outgoing message to the remote physical layer device through the supplemental channel, the request relating to a physical layer operation to be performed at the remote physical layer device,
  receive a response from the remote physical layer device through the supplemental channel,
  convert the response from the second communication format to the first communication format, the response comprising data associated with the physical layer operation performed at the remote physical layer device, and
  send the converted response to the controller device through the management component using the second path.

15. The communication device of claim 14, wherein the first path relates to a gigabit media independent interface (GMII).

16. The communication device of claim 14, wherein the second path relates to a management data input/output (MDIO) interface.

17. The communication device of claim 14, wherein the transmission line relates to a medium dependent interface (MDI).

18. The communication device of claim 14, wherein the transmission line comprises a single twisted pair of wires.

19. The communication device of claim 14, wherein the data channel corresponds to a data rate up to 1.0 Gigabits-per-second and the supplemental channel corresponds to a data rate up to 2.5 Megabits-per-second.

20. The communication device of claim 14, wherein the outgoing message comprises:
  a first communication segment including an operation block, an address block and an indication block, the operation block including an indication of the physical layer operation, the address block identifying a register address associated with a register of the remote physical layer device, the indication block identifying whether the physical layer operation relates to a query or an answer to the query;
  a second communication segment including a first data block, the data block including first data for storage in the register at the register address; and
  a third communication segment including a second data block, the second data block including second data for storage in the register at the register address, and
  wherein the second communication segment is sent subsequent to the first communication segment and the third communication segment is sent subsequent to the second communication segment.

* * * * *